Patented Aug. 8, 1933

1,920,980

UNITED STATES PATENT OFFICE 1,920,980

PROCESS OF MAKING SYNTHETIC RESINS, AND COATING-COMPOSITIONS CONTAINING THEM

Chester G. Gauerke, Wilmington, Del., assignor to E. I. du Pont de Nemours & Company, Wilmington, Del., a Corporation of Delaware No Drawing. Application June 26, 1928
Serial No. 288,540

7 Claims. (Cl. 260—8)

This invention relates to resins and more particularly to a resin containing beta-eleostearic acid.

It has been known for a number of years that if raw China-wood oil be subjected to the action of light for a long period of time or treated with certain chemical agents, as for example, iodine in a suitable solvent, the triglyceride of alpha-eleostearic acid (alpha-eleostearin), which comprises from 75 to 85% of the raw oil, is completely or almost completely transformed into a solid. This solid is commonly supposed to be the beta-isomer of the liquid alpha-eleostearin. While this phenomenon has been known for some time no effort has hitherto been made to utilize this purified wood oil fraction, which is not readily soluble in the usual organic solvents, for the purposes herein described.

An object of this invention is to utilize beta-eleostearic acid in the making of a resin. A further object is to produce a fast drying coating composition containing the above mentioned resin. Other objects will appear hereinafter.

These objects are accomplished by the following invention of a method for the substitution of beta-eleostearic acid for the customary drying oil acids in resins and the utilization of the resins so produced in coating compositions.

Before disclosing the invention itself, I will describe one method I have found advantageous for the separation and purification of beta-eleostearin and for the preparation of beta-eleostearic acid. Raw China-wood oil is treated with about .03 to .05% of iodine (based on the weight of oil) in a dilute alcoholic solution (2½ to 5%). The oil thus treated is allowed to stand until it has set to a more or less completely solid mass, which usually requires several days, after which the oil is thoroughly mixed with about one-third of its weight of acetone and centrifuged to remove the liquid residue, which is soluble in the acetone. While in the centrifuge the solid oil is washed with several successive portions of acetone to secure a product as free as possible from traces of iodine and liquid oil residue. The yield of solid oil is approximately 50% of the weight of the raw oil used. The purified material obtained is known as beta-eleostearin and is a white solid with a melting point of about 61° C. It is more or less insoluble in the ordinary oil solvents. Beta-eleostearic acid may be prepared by treating the beta-oleostearin with a solution of sodium hydroxide and subsequently treating the resulting sodium eleostearate with dilute hydrochloric acid.

I have discovered that beta-eleostearic acid may be used as a substitute for other drying oil acids commonly employed in resins and that by the use of such resins in a varnish, an exceedingly quick drying product may be obtained. As one embodiment of my invention I may esterify glycerin with a combination of phthalic anhydride, resin acid and beta-eleostearic acid to produce a modified polyhydric alcohol-polybasic acid resin composed of 22% glyceryl phthalate, 51% of heat treated Congo glyceride and 27% of the glyceride of beta-eleostearic acid. The resin may be prepared according to the following procedure. A mixture comprising 11.39% glycerol, 16.21% phthalic anhydride, 47.69% heat treated Congo gum and 24.71% beta-eleostearic acid is heated gradually to 180° C. during 45 minutes, held at that temperature for 30 minutes and then brought gradually to 250° C. during 30 minutes and held at that temperature for 20 minutes. The resin may then be cut hot in hi-flash naphtha.

Any suitable method of resin preparation may be used and the beta-eleostearic acid may be used in the preparation of any resin of the type normally modified, either wholly or in part, by drying oil acids. It is to be understood the esterified product is a mixed ester, and not merely a mixture of the three glycerides as given in the above mentioned composition, and this mixed ester may contain the dibasic and monobasic acid radicals in practically any proportion. The glycerin may be esterified with a combination of phthalic acid, resin acid and beta-eleostearic acid or with a combination of phthalic acid and beta-eleostearic acid.

In place of glycerol, I may use any polyhydric alcohol, such as glycol, mannitol, pentaerythrite, etc., and instead of phthalic anhydride I may use any polybasic acid, such as malic, succinic, camphoric, tartaric, citric, etc.

The resin prepared as described above may be utilized in the preparation of an exceedingly quick drying varnish and the following is an example of such a varnish. The resin is cut hot in hi-flash naphtha, as stated above, and in the meanwhile a suitable amount of liquid cobalt drier is incorporated. The varnish may be prepared in the following proportions:

| | |
|---|---|
| Resin | 150 grams |
| Hi-flash naphtha | 275 grams |
| Liquid cobalt drier | 4.95 grams |

The liquid cobalt drier may be a 10% solution (approximately) of cobalt linoleate in turpentine and may contain .75% of cobalt, as metal, based on the total weight of liquid drier. A varnish so prepared dries dust-free in about 37 minutes as compared with about 57 minutes for a varnish prepared in exactly the same manner except for the use of a resin modified by the acids from ordinary China-wood oil. The varnish made in accordance with my invention is in addition lighter in color, harder though equally as flexible, and does not print as badly.

Resins made in accordance with my invention may be used not only in the preparation of clear varnishes, as in the above example, but also in the preparation of pigmented coating compositions.

As many apparently widely different embodiments of this invention may be made without departing from the spirit and scope thereof, it is to be understood that I do not limit myself to the specific embodiments thereof except as defined in the appended claims.

I claim:

1. Process which comprises esterifying a polyhydric alcohol with an organic polybasic acid and beta-eleostearic acid which is substantially free from the other fatty acid components of China-wood oil, said esterification being carried out in the absence of sulfuric acid.

2. Process which comprises esterifying a polyhydric alcohol with phthalic anhydride and substantially pure beta-eleostearic acid, said esterification being carried out in the absence of sulfuric acid.

3. Process which comprises esterifying glycerin with an organic polybasic acid and beta-eleostearic acid which is substantially free from the other fatty and components of China-wood oil, said esterification being carried out in the absence of sulfuric acid.

4. Process of making a modified polyhydric alcohol-polybasic acid resin which comprises esterifying glycerin with phthalic anhydride and beta-eleostearic acid which is substantially free from the other fatty acid components of China-wood oil, said esterification being carried out in the absence of sulfuric acid.

5. Process of making a modified polyhydric alcohol-polybasic acid resin which comprises esterifying glycerin with phthalic anhydride, resin acid and substantially pure beta-eleostearic acid, said esterification being carried out in the absence of sulfuric acid.

6. Process of making a modified polyhydric alcohol-polybasic acid resin which comprises heating a mixture containing glycerol, phthalic anhydride, heat treated Congo resin and substantially pure beta-eleostearic acid, said heating being carried out in the absence of sulfuric acid.

7. In a coating composition, a resin formed from a polyhydric alcohol esterified with an organic polybasic acid and beta-eleostearic acid which is substantially free from the other fatty acid components of China-wood oil, said esterification being carried out in the absence of sulfuric acid.

CHESTER G. GAUERKE.

CERTIFICATE OF CORRECTION.

Patent No. 1,920,980.          August 8, 1933.

CHESTER G. GAUERKE.

It is hereby certified that error appears in the printed specification of the above numbered patent requiring correction as follows: In the heading to the printed specification, line 3, for "COATING-COMPOSITIONS" read "COATING COMPOSITIONS"; page 1, line 52, for "beta-oleostearin" read "beta-eleostearin"; page 2, line 79, claim 3, for "and" read "acid"; and that the said Letters Patent should be read with these corrections therein that the same may conform to the record of the case in the Patent Office.

Signed and sealed this 19th day of September, A. D. 1933.

M. J. Moore.

(Seal)                      Acting Commissioner of Patents.

and may contain .75% of cobalt, as metal, based on the total weight of liquid drier. A varnish so prepared dries dust-free in about 37 minutes as compared with about 57 minutes for a varnish prepared in exactly the same manner except for the use of a resin modified by the acids from ordinary China-wood oil. The varnish made in accordance with my invention is in addition lighter in color, harder though equally as flexible, and does not print as badly.

Resins made in accordance with my invention may be used not only in the preparation of clear varnishes, as in the above example, but also in the preparation of pigmented coating compositions.

As many apparently widely different embodiments of this invention may be made without departing from the spirit and scope thereof, it is to be understood that I do not limit myself to the specific embodiments thereof except as defined in the appended claims.

I claim:

1. Process which comprises esterifying a polyhydric alcohol with an organic polybasic acid and beta-eleostearic acid which is substantially free from the other fatty acid components of China-wood oil, said esterification being carried out in the absence of sulfuric acid.

2. Process which comprises esterifying a polyhydric alcohol with phthalic anhydride and substantially pure beta-eleostearic acid, said esterification being carried out in the absence of sulfuric acid.

3. Process which comprises esterifying glycerin with an organic polybasic acid and beta-eleostearic acid which is substantially free from the other fatty acid and components of China-wood oil, said esterification being carried out in the absence of sulfuric acid.

4. Process of making a modified polyhydric alcohol-polybasic acid resin which comprises esterifying glycerin with phthalic anhydride and beta-eleostearic acid which is substantially free from the other fatty acid components of China-wood oil, said esterification being carried out in the absence of sulfuric acid.

5. Process of making a modified polyhydric alcohol-polybasic acid resin which comprises esterifying glycerin with phthalic anhydride, resin acid and substantially pure beta-eleostearic acid, said esterification being carried out in the absence of sulfuric acid.

6. Process of making a modified polyhydric alcohol-polybasic acid resin which comprises heating a mixture containing glycerol, phthalic anhydride, heat treated Congo resin and substantially pure beta-eleostearic acid, said heating being carried out in the absence of sulfuric acid.

7. In a coating composition, a resin formed from a polyhydric alcohol esterified with an organic polybasic acid and beta-eleostearic acid which is substantially free from the other fatty acid components of China-wood oil, said esterification being carried out in the absence of sulfuric acid.

CHESTER G. GAUERKE.

CERTIFICATE OF CORRECTION.

Patent No. 1,920,980.    August 8, 1933.

CHESTER G. GAUERKE.

It is hereby certified that error appears in the printed specification of the above numbered patent requiring correction as follows: In the heading to the printed specification, line 3, for "COATING-COMPOSITIONS" read "COATING COMPOSITIONS"; page 1, line 52, for "beta-oleostearin" read "beta-eleostearin"; page 2, line 79, claim 3, for "and" read "acid"; and that the said Letters Patent should be read with these corrections therein that the same may conform to the record of the case in the Patent Office.

Signed and sealed this 19th day of September, A. D. 1933.

M. J. Moore.

(Seal)    Acting Commissioner of Patents.

CERTIFICATE OF CORRECTION.

Patent No. 1,920,980.　　　　　　　　　　　　　　　August 8, 1933.

CHESTER G. GAUERKE.

It is hereby certified that error appears in the printed specification of the above numbered patent requiring correction as follows: In the heading to the printed specification, line 3, for "COATING-COMPOSITIONS" read "COATING COMPOSITIONS"; page 1, line 52, for "beta-oleostearin" read "beta-eleostearin"; page 2, line 79, claim 3, for "and" read "acid"; and that the said Letters Patent should be read with these corrections therein that the same may conform to the record of the case in the Patent Office.

Signed and sealed this 19th day of September, A. D. 1933.

M. J. Moore.

(Seal)　　　　　　　　　　　　　　　　　Acting Commissioner of Patents.